United States Patent [19]

Kono

[11] Patent Number: 5,252,959
[45] Date of Patent: Oct. 12, 1993

[54] METHOD AND APPARATUS FOR CONTROLLING A MULTIGRADATION DISPLAY

[75] Inventor: Masaru Kono, Suwa, Japan

[73] Assignee: Seiko Epson Corporation, Tokyo, Japan

[21] Appl. No.: 921,443

[22] Filed: Jul. 27, 1992

Related U.S. Application Data

[63] Continuation of Ser. No. 481,971, Feb. 16, 1990, abandoned.

[30] Foreign Application Priority Data

Feb. 20, 1989 [JP] Japan ................................... 1-39725
Apr. 19, 1989 [JP] Japan ................................... 1-99114
Nov. 17, 1989 [JP] Japan ................................... 1-298842

[51] Int. Cl.$^5$ ............................................. G09G 3/00
[52] U.S. Cl. ...................................... 345/147; 345/89
[58] Field of Search ............... 340/793, 784, 767, 701, 340/805; 358/455–459

[56] References Cited

U.S. PATENT DOCUMENTS

| | | | |
|---|---|---|---|
| 4,698,691 | 10/1987 | Suzuki et al. | 358/458 |
| 4,769,713 | 9/1988 | Yasui | 358/236 |
| 4,850,675 | 7/1989 | Hatanaka et al. | 340/793 |
| 4,859,998 | 8/1989 | Kawamura et al. | 340/793 |
| 4,936,589 | 7/1990 | Fischer et al. | 358/456 |

FOREIGN PATENT DOCUMENTS 0193728 10/1986 European Pat. Off. .
244018 10/1987 Japan .
287828 11/1988 Japan .
03577 3/1984 PCT Int'l Appl. .
04505 11/1988 PCT Int'l Appl. .

Primary Examiner—Ulysses Weldon
Assistant Examiner—Regina Liang
Attorney, Agent, or Firm—W. Douglas Carothers, Jr.

[57] ABSTRACT

A multi-gradation display control method comprises activating selected dots in selected of a plurality of defined submatrices together constituting the entire dot matrix display, e.g., a two dimensional LCD panel, whereby a distribution of dispersion field of dots within defined submatrices are activated to display an image in multi-gradations. A defined dot submatrix has a predetermined distribution of individual activated or unactivated dots in a single frame to form a predefined gradation pattern. The predetermined distribution of dots is changed in succeeding frames of the entire dot matrix so that the dot positions activated or unactivated in a succeeding frame are not the same dot positions activated or unactivated in a previous frame. Preferably, the dot position activated in any given frame of a defined n dots by n dots submatrix are not adjacent to dot positions activated in a previous frame and are not adjacent to dot positions to be activated in a succeeding frame. At least two different two dimensional sizes of submatrices are provided to form a series of multi-gradations. As a result, defined dot matrices of different sizes are determined for different gradations wherein different gray scale representations can be produced without substantial pattern interference or objectionable fringes annoying to the naked eye.

36 Claims, 9 Drawing Sheets

METHOD AND APPARATUS FOR CONTROLLING A MULTIGRADATION DISPLAY

This is a continuation of copending application Ser. No. 07/481,971 filed Feb. 16, 1990 is now abandoned.

BACKGROUND OF THE INVENTION

This invention relates generally to a multi-gradation display for displaying images, such as letters, patterns, etc., and more particularly to a method for controlling the display of images in multi-gradations by activating a selected number of dots or pixels in a plurality of defined dot submatrices which together comprise the entire image display, e.g., an active matrix display panel.

One example of devices which can display images in multi-gradations are liquid crystal display (LCD) panels, which devices are employed as displays for televisions, personal computers and the like. In these LCD panels, gray scale gradations may be realized in the following manner. First, in order to display an image on a display panel in multi-gradations, different gradations are created by activating, in each of a plurality of predefined submatrices or subgroups, a selected or predetermined number of n dots in the horizontal direction of the display panel. Thus, the defined submatrices together, in a tiled-like screen fashion, comprise the entire dot matrix display body for displaying an image. The positions of these activated dots throughout each submatrix, i.e., those selected dots in a defined submatrix turned on in response to received data signals, are changed to new positions in each submatrix per frame of the dot matrix display. It is conventional practice to apply a cycle of vertical occurrences of activated dots in each submatrix whose positions are changed from frame to frame, which change is the same for every gradation, e.g., the same n dots are sequentially activated in different horizontal rows of each defined submatrix. In other words, in an n dots by n dots submatrix or subgroup, line groups of activated dots within the respective submatrix may be shifted vertically up or down and/or horizontally right or left in sequential frames to thereby enable different levels of gradation and provide multi-gradation displays of an image. This conventional practice is explained now in further detail with reference to FIG. 1.

Figures 1A, 1B:
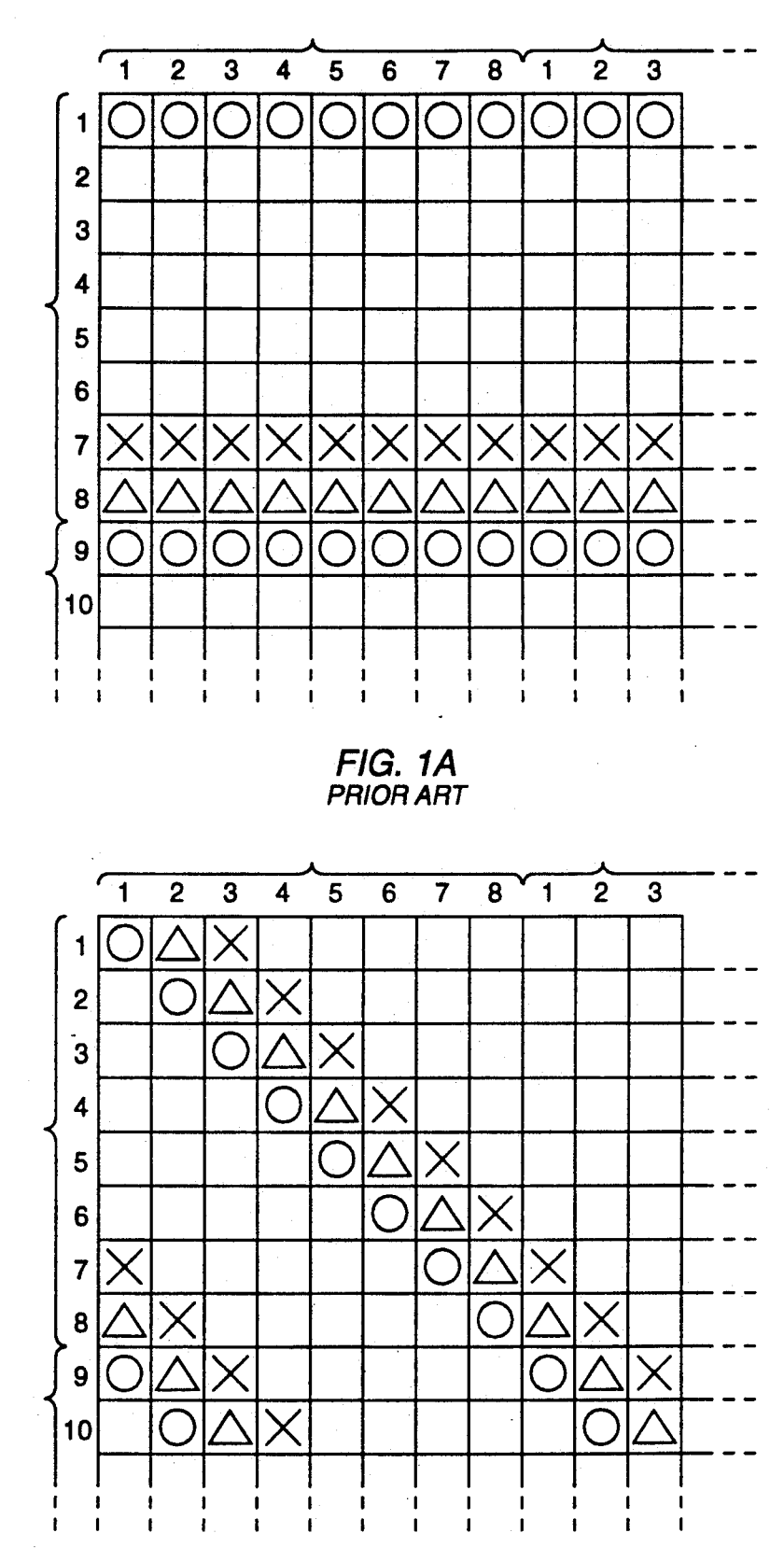

FIGS. 1A and 1B illustrate a single 8 dot by 8 dot defined submatrix in a larger active matrix LCD panel. In FIG. 1A, in a first applied frame, all the dots in the first horizontal row of the submatrix, indicated as circles, are activated. In the next or second frame, all the dots, indicated as triangles in the eighth horizontal row of the submatrix, are activated. Then, in the third frame, all the dots, indicated by crosses in the seventh horizontal row of the submatrix, are activated and so on. As a result, all of the respective 8×8=64 dots become activated once in the first to eighth frames of the dot matrix display and the display is characterized as being of $\frac{1}{8}$ gradation. In the example of FIG. 1B, the distributions of the activated dots in the several respective dot matrix frames are sequentially applied as different spatial oblique rows across the submatrix. This example is also characterized as being of $\frac{1}{8}$ gradation.

These prior art matrix displays, however, have disadvantages in that, when a gradation image occupies an area on an LCD panel larger than an n by n dot defined submatrix, fringes occur. Also, when the gradation image occupies an area on an LCD panel smaller than an n by n dot defined submatrix, the activated dots interfere with one another with a result that more conspicuous fringes occur which are sensed by and disturbing to the naked human eye. The fringes become especially objectionable and disturbing when tiling patterns are created between different types of gradations.

On the other hand, Tateuchi et al. described in Japanese Patent Laid-Open Publication No. 287828/1988 an LCD driving method in which the positions of selective dots, which are activated in the same phase, are in scattered locations of a display panel in order to prevent display flickering. It is difficult, however, to employ this particular approach for the purpose of preventing activated dot interference which produces fringes and results in an unsatisfactory multi-gradation display.

It is, therefore, an object of this invention to provide an improved multi-gradation display.

It is another object of this invention to provide a display control method for a multi-gradation image display which is substantially free from the above mentioned disadvantages.

It is a further object of this invention to provide a display having gray scale capability that is substantially free of interference annoyance perceptible to the naked human eye.

It is another object of this invention to provide a multi-gradation display which will exhibit easily discernable images without the experience of objectionable fringes.

SUMMARY OF THE INVENTION

According to this invention a multi-gradation display control method comprises activating selected dots in selected of a plurality of defined submatrices together constituting the entire dot matrix display, e.g., a two dimensional LCD panel, whereby a distribution of dispersion field of dots within defined submatrices are activated to display an image in multi-gradations. A defined dot submatrix has a predetermined distribution of individual activated or unactivated dots in a single frame to form a predefined gradation pattern. Also, a submatrix may have a different two dimensional size from other submatrices. The predetermined distribution of dots is changed in succeeding frames of the entire dot matrix so that the dot positions activated or unactivated in a succeeding frame are not the same dot positions activated or unactivated in a previous frame. Preferably, the dot positions activated in any given frame of a defined n dots by n dots submatrix are not adjacent to dot positions activated in a previous frame and are not adjacent to dot positions to be activated in a succeeding frame. At least two different two dimensional sizes of submatrices are provided to form a series of multi-gradations. A different gradation size for a submatrix is defined, for example, by providing a smaller set of n dots by n dots, which defines the largest submatrix size, i.e., there are less n dots rows in one orthogonal direction of the submatrix. As a result, defined dot matrices of different sizes are determined for different gradations wherein different gray scale representations can be produced in a manner that activated dots: (1) are scattered in both the horizontal and the vertical directions of the respective submatrices, (2) are positioned at selected random positions along the vertical and the horizontal scan lines, (3) relative to a given frame of a defined submatrix, (a) are not adjacent to one another and (b) are not adjacent to one another relative to a preceding or succeeding frame and (4) are laterally shifted between consecutive frames one or more dot positions, either vertically, horizontally or diagonally, within a defined submatrix. As a result, the probability is exceedingly low that the occurrence of adjacently disposed, activated dots in a defined submatrix will appear in one row in consecutive frames so that the display of images is substantially free of annoying interference and fringes.

In this invention, the selected gradation dispersion pattern of activated dots in each defined submatrix of the display field is laterally shifted as a group for a repeated number of times possible (defined as K frames of address of the entire dot matrix) to produce a series of shifted dot dispersion or distribution patterns until the reappearance of the initially or first displayed pattern. By changing, in particular, reducing, the submatrix size employed for some of the gradations in the multi-gradation display, the number of frames required to proceed through all possible shifted dot patterns before returning to the first pattern is increased by the least common multiple. With multiple shift patterns for different size gradations, it is possible to have dots in consecutive patterns of a particular gradation that do not contain adjacently position activated dots in consecutively display shifted dispersion patterns within a defined dot submatrix. As a result, interferences between different gradations may be suppressed and improved picture quality is achieved.

The present invention, its objects and attainments will become more fully understood and appreciated from the following detailed description taken in conjunction with the accompanying drawings and claims provided only for the purposes of illustration and, thus, are not intended or to be considered as limiting the scope of the invention.

BRIEF DESCRIPTION OF THE DRAWINGS

FIGS. 1A and 1B are respective views illustrating dot submatrices as known in the prior art.

DESCRIPTION OF THE PREFERRED EMBODIMENTS

Reference is now made to FIGS. 2A to 2F disclosing various views of dot pixel submatricies to explain the display driving method according to one embodiment of this invention. These figures illustrate different defined sizes of a series of submatrices from a Gradation 1, i.e., ⅛ gradation display, to a Gradation 6, i.e., a ⅞ gradation display. Each of the respective dot submatrices contain 8 dots in the horizontal direction. However, relative to the vertical direction, Gradations 1 and 6 each have eight dot rows, Gradations 2 and 5 each have five dot rows, and Gradations 3 and 4 each have three dot rows. Letters and patterns may be displayed in different gradations by activating dots in a row pattern, indicated as circles in each Gradation 1 to 6 in FIGS. 2A to 2F, which rows are activated in a first frame and, then, other dot rows are activated in the next frame and so on.

Figure 2A:
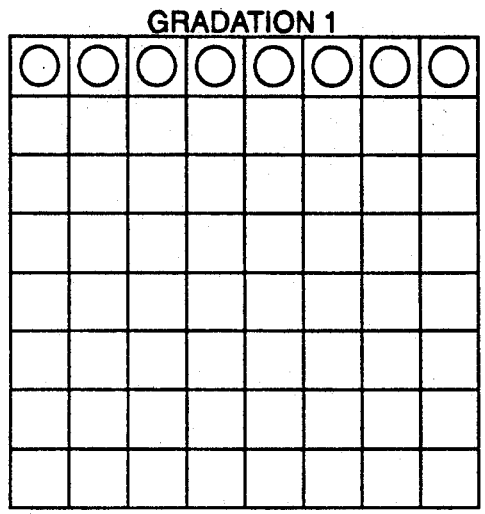
FIGS. 2A to 2F are a series of defined dot submatrices employed in the method of multi-gradation according to one embodiment of this invention.

As a specific example, reference is made to the gradation pattern for Gradation 1 in FIG. 2A. The first row of horizontal dots, indicated by circles in FIG. 2A, is activated in the first frame. In the second frame, the eighth row or the bottom row of dots of the submatrix is activated. In the third frame, the seventh row of dots immediately next above the bottom row of dots is activated. In the following fourth to eight frames, the sixth row to the second row of dots are sequentially activated. In the ninth frame, as in the case of the first frame, the first row of dots is again activated. This sequential occurrence is then repeated. Thus, in the submatrix of FIG. 2A, the respective $8 \times 8 = 64$ dots become activated once in eight consecutive frames. As a result, a ⅛ gradation display is created.

Figure 2B:
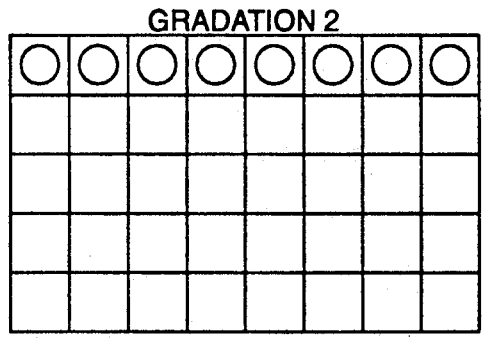
Figure 2C:
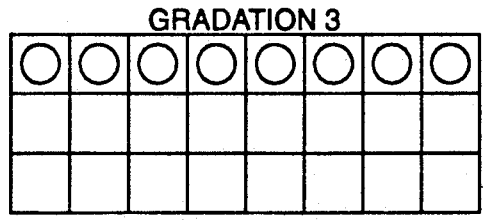
Figure 2D:
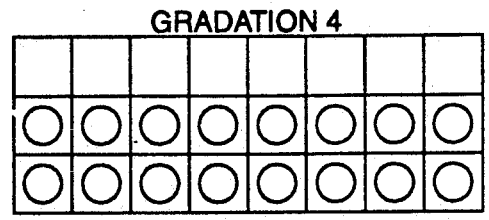
Figure 2E:
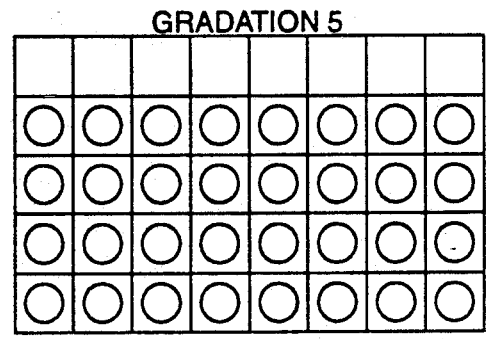
Figure 2F:
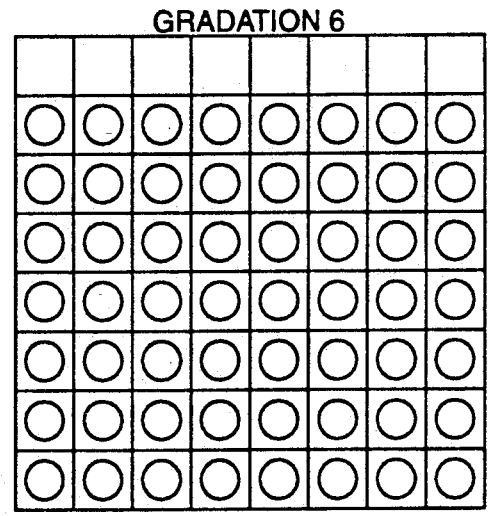

The same sequence of operation is true relative to the gradations of FIGS. 2B and 2C except that the submatrix two dimensional size is smaller and the pattern of sequential row changes is shortened, i.e., the dots of Gradation 2 become activated once in five frames and once in three frames for Gradation 3. In the case of FIGS. 2D to 2F, the gradation is formed by inactivation of a selected row of dots relative to all other dots in the submatrix, which are in an activated state. Thus, in the case of FIG. 2F, the first row of horizontal dots, indicated without circles in FIG. 2A, is deactivated in the first frame. In the second frame, the eighth row or the bottom row of dots of the submatrix is deactivated. In the third frame, the seventh row of dots immediately next above the bottom row of dots is deactivated. In the following fourth to eight frames, the sixth row to the second row of dots are sequentially deactivated. In the ninth frame, as in the case of the first frame, the first row of dots is again deactivated. This sequential occurrence is then repeated. Thus, in the submatrix of FIG. 2F, the respective $8 \times 8 = 64$ dots become deactivated once in eight consecutive frames. As a result, a ⅞ gradation display is created.

FIG. 3 illustrate gradation patterns for Gradations 1 to 6 which are a modification of the embodiment FIGS. 2. In this modified embodiment as in the case of the embodiment of FIG. 2, dot submatrices of different gradation sizes are provided to form different gradations. However, the embodiment of FIG. 3 is different from the embodiment of FIG. 2 in that in FIG. 3, the activated dots in the respective frames are randomly but quasi-uniformly scattered in the defined dot submatrices. In other words, the activated dots of the respective frames are scattered in a substantially homogeneously manner both in the horizontal and the vertical directions of the defined dot matrices and the positions of the activated dots are shifted vertically in the consecutive frames for a given Gradation. Accordingly, control is conducted so that the respective dots become activated once in eight frames for Gradation 1, once in five frames for Gradation 2, and once in three frames for Gradation 3. Control is conducted so that the respective dots become activated twice in three frames for Gradation 4, four times in five frames for Gradation 5, and seven times in eight frames for Gradation 6.

Figure 3A:
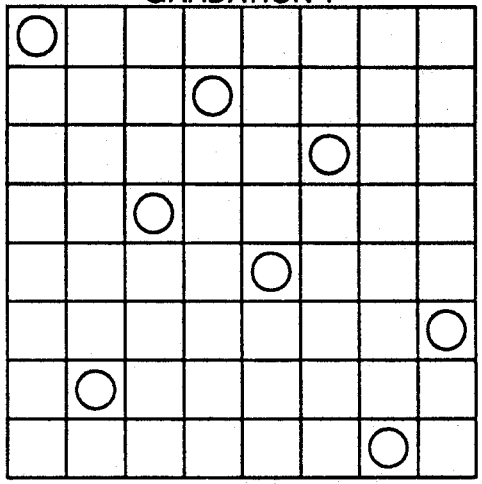
FIGS. 3A to 3F are series of defined dot submatrices employed in the method of multi-gradation according to another embodiment of this invention.
Figure 3B:
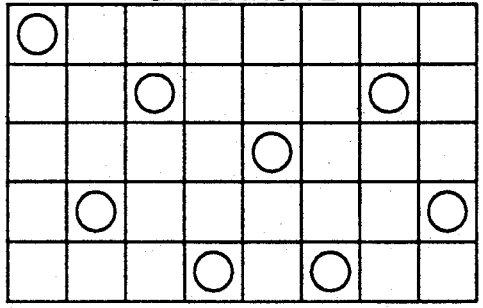
Figure 3C:
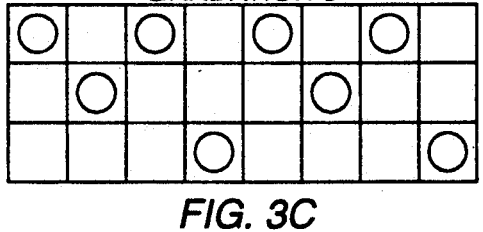
Figure 3D:
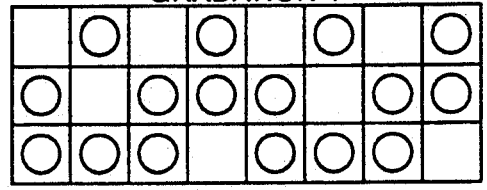
Figure 3E:
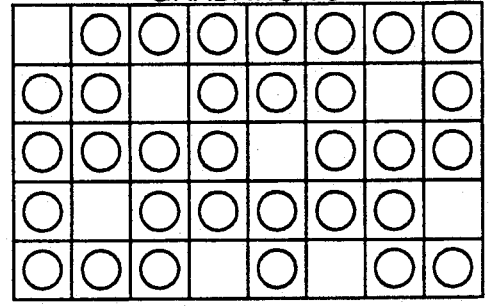
Figure 3F:
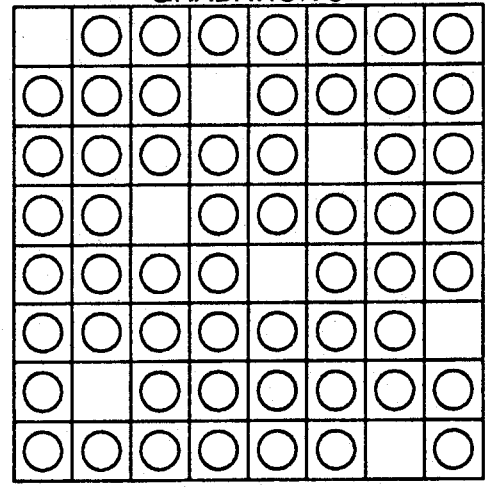

A characteristic of the method according to this invention is that at least either of the horizontal and the vertical sizes of a defined dot submatrix is changed in accordance with a gradation of an image to be displayed. In other words, when a defined dot submatrix is n dots by m dots (both n and m being natural numbers), at least either n and m is a variable or different value relative to a particular gradation pattern. Here, a plurality of selected dots are turned on, i.e., activated dots, in a plurality of defined submatrices in a given frame together which form a two dimensional pattern over an entire matrix display body, to form an initial distribution pattern. Then, there is a required K frames (K being a natural number) of shifted distribution patterns for a given gradation until the same initial pattern again reappears and the respective dots in a defined submatrix will become activated an equal or given number of times in K frames. For example, in FIG. 3A, the respective dots become activated once in eight frames. In FIG. 3E, the respective dots become activated four times in five frames. As a result, consecutive white pixels and black pixels within a given submatrix do not occur on the display panel, and, in addition, homogeneous gradation displays are enabled without uneven appearing gradations.

It should be noted that it is not a requirement of this invention to control a dot matrix display, such as an LCD panel, in a manner that a dot in a defined submatrix, at a position immediately below a dot activated in a given frame, becomes activated in the next frame; or in a frame following such next frame, a dot immediately below the dot which has been activated, becomes activated. According to this invention, defined dot submatrices of different sizes are set for different gradations, and respective dots of a defined dot submatrix for a selected gradation become activated an equal and predetermined number of times in a set number of frames wherein the position of activated dots in a submatrix may be different for different submatrices and the lateral shift of activated dots within a submatrix is made in consecutive frames. This invention is applicable to a color display wherein three kinds of dots, R (red), G (green) and B (blue), are selectively activated. Also, the application of this invention is not limited to LCD panels but also is applicable to EL (electroluminescent) panels, or PD (plasma display) panels, as long as these displays are capable of being addressed and displayed in multi-gradations through the activation of selective dots or pixels in predefined groups of such dots or pixels.

Figure 4A:
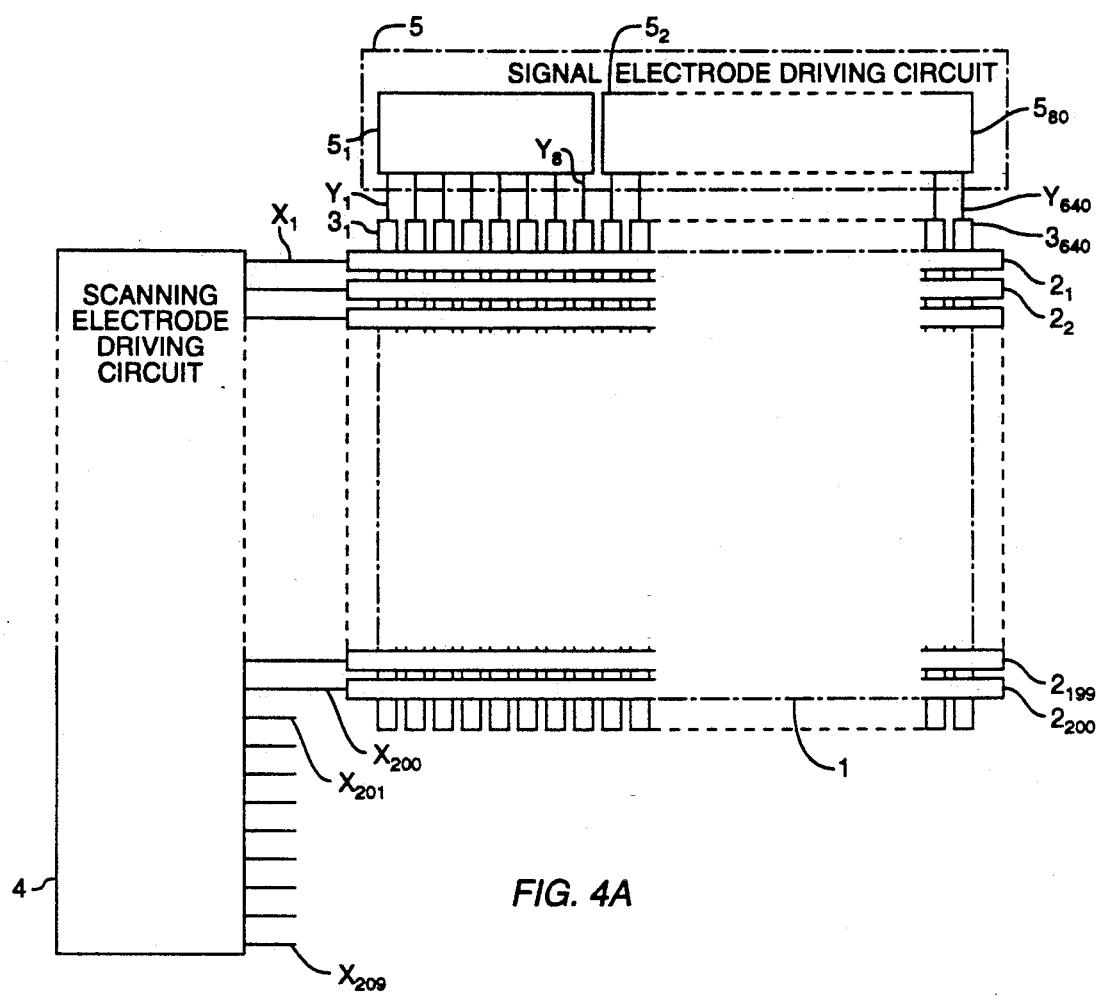
FIG. 4A is a circuit diagram of a submatrix electrode structure of a display panel employed for the practice of this invention.
Figure 4B:
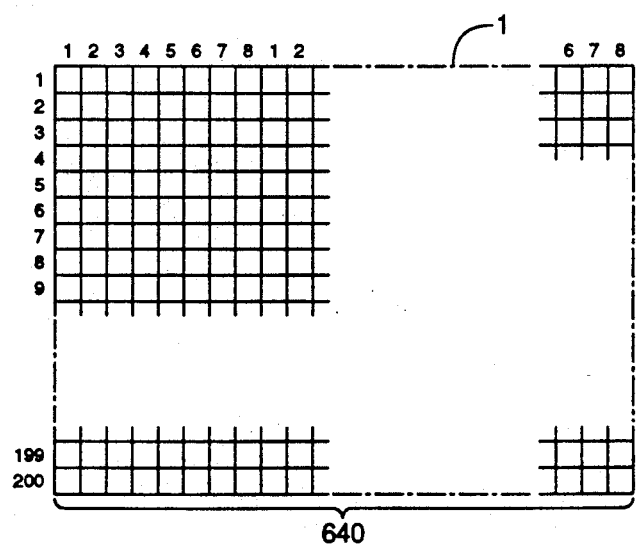
FIG. 4B is an illustration of the dot matrix of the display body or panel of FIG. 4A.

FIG. 4A is diagrammatic view of a LCD panel and its associated control circuit employed in conjunction with this invention and for the purpose of illustrating the method of this invention. FIG. 4B is a diagrammatic view of a dot matrix display body for the LCD panel shown in FIG. 4A. Display portion 1 of the LCD panel comprises 200 horizontal scanning electrodes $2_1$ to $2_{200}$, and 640 vertical signal electrodes $3_1$ to $3_{640}$ formed in orthogonal relationship and provides for 200×640 dot matrix illustrated in FIG. 4B. Scanning electrode driving circuit 4 provides vertical scan signals, $X_1$ to $X_{200}$, to scan electrodes $2_1$ to $2_{200}$. Signal electrode driving circuit 5 supplies data signals $Y_1$ to $Y_{640}$ to signal electrodes $3_1$ to $3_{640}$. Signal electrode driving circuit 5 comprises 80 element circuits $5_1$ to $5_{80}$. The respective element circuits are responsible for applying data signals Y each for sets of 8 dots, e.g., first element circuit $5_1$ outputs data signals $Y_1$ to $Y_8$, next element circuit $5_2$ outputs data signals $Y_9$ to $Y_{16}$ and so on. Thus, the signal electrode driving circuit 5 outputs 8 data signals for each element circuit $5_1$ to $5_{80}$ comprising a total of 640 data signals $Y_1$ to $Y_{640}$.

Scanning electrode driving circuit 4 outputs horizontal scan signals sequentially from $X_1$ to $X_{209}$. When the circuit 4 has applied the last horizontal scan signal $X_{209}$, the process is repeated with the output of horizontal scan signal $X_1$ followed sequentially with horizontal scan signals $X_2$, $X_3$, etc. However, it should be noted that there are no corresponding scan electrodes $2_{201}$ to $2_{209}$ for scan signals $X_{201}$ to $X_{209}$. Accordingly, the activated area of the panel, i.e., an area of the panel where an image is to be displayed, is 200 dots in the vertical direction of the panel, as illustrated in FIG. 4B. The additional scan signals are employed relative to the vertical shifts of activated dot distribution patterns in dot submatrices adjacent the bottom edge of the display portion 1 during consecutive frames relative to a selected gradation in order to complete K frames for the submatrices.

The display portion 1 has a size of 640 dots, i.e., 80 times 8-dot elements in the horizontal direction, and 200 dots in the vertical direction. In designing LCD panels for image displays for practical applications, such as for personal computers and the like, it is preferable that two panels of 200 dots by 640 dots panels be employed together to provide a 400 dots by 640 dots display field.

Figure 5:
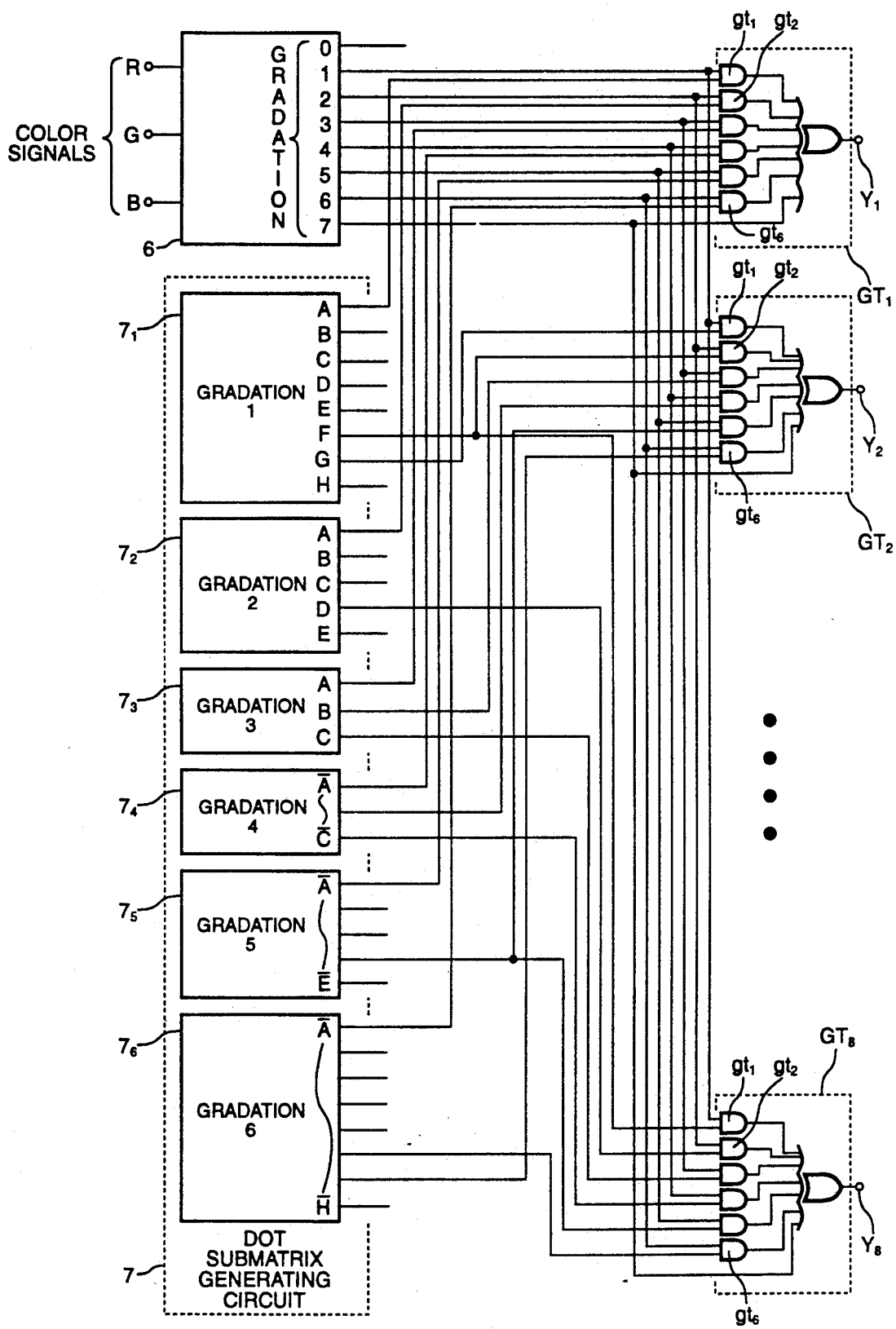
FIG. 5 is a circuit diagram of a signal electrode driving circuit employed in the display panel shown in FIG. 4A.

FIG. 5 shows the detailed structure of an element circuit 5, e.g., $5_1$, of FIG. 4A. Element circuit 5 comprises gradation data decoder 6, a dot submatrix generating circuit 7 and output gate circuits, $GT_x$, comprising eight gate units, $GT_1$ to $GT_8$. Gradation decoder 6 decodes a color signal of 3 bits, R and G (most significant bits) and B (least significant bit), to supply an activating signal to one of its gradation output terminals 0 to 7 for selecting a designated gradation, i.e., the activating signal places the selected output terminal at a HIGH or state, "1". The output terminal for Gradation 0 of gradation decoder 6 is open so that when the selected gradation is 0, the data signals $Y_1$ to $Y_8$ from the GT circuits are always zero. The output terminal for Gradation 7 is connected directly to an OR gate of each of the GT output gate circuits so that when the gradation is 7, the data signals $Y_1$ to $Y_8$ are always a HIGH or "1", i.e., in an activated state. For Gradations 1 to 6, high speed control and activation must be provided for the respective dots to be activated relative to these gradations. This is accomplished by one of the associated dot submatrix generating circuits 7.

Dot submatrix generating circuits 7 comprise respective generating circuits units $7_1$ to $7_6$ for generating the respective dot submatrix patterns for Gradations 1 to 6 and provide designated output signals from their output terminals, indicated by A to H and $\overline{A}$ to $\overline{H}$ in FIG. 5, which are supplied to respective GT output gate circuits. The eight gate units $GT_1$ to $GT_8$ of the GT output gate circuits respectively correspond to the data signals $Y_1$ to $Y_8$. The respective gate units $GT_1$ to $GT_8$ are supplied with designated gradation outputs from gradation data decoder 6, and designated output signals from the A to H output terminals and the $\overline{A}$ to $\overline{H}$ output terminals of dot matrix generating circuits 7. When the output signals of any one or more output terminals A to H and $\overline{A}$ to $\overline{H}$ are HIGH or "1", activation dot signals are provided to the respective GT output gate circuits.

As an example of the operation of circuit 5, an output from Gradation 1 of gradation data decoder 6 is supplied to AND gates $gt_1$ of the respective gate units $GT_1$ $GT_8$; an output from Gradation 2 is supplied to AND gates $gt_2$; an output for Gradation 3 is supplied to AND gates $gt_3$; and so on. The outputs A to H of dot submatrix generating circuit $7_1$ for Gradation 1 are supplied to AND gate $gt_1$ of the respective gate units $GT_1$ to $GT_8$ in the sequential order of 1, 4, 6, 3, 5, 8, 2, 7 beginning from the top of the units as indicated in FIG. 5. In other words, the outputs of the output terminals A to H of the dot submatrix generating circuit $7_1$ are supplied to the respective AND gates in a combination of $A=GT_1$, $B=GT_4$, $C=GT_6$, $D=GT_3$, $E=GT_5$, $F=GT_8$, $G=GT_2$, and $H=GT_7$. The outputs of the output terminals A to E of dot matrix generating circuit $7_2$ for Gradation 2 are supplied to respective AND gate units $gt_2$ in a combination of $A=GT_1$; $B=GT_3$, $GT_7$; $C=GT_5$; $D=GT_2$, $GT_8$; $E=GT_4$, and $GT_6$. The outputs of output terminals A to C of dot matrix generating circuit $7_3$ for gradation 3 are supplied to respective AND gate units $gt_3$ in combination of $A=GT_1$, $GT_3$, $GT_5$; $B=GT_2$, $GT_6$; $C=GT_4$, and $GT_8$. The outputs for Gradation 4 are supplied in the same combination as in the case for Gradation 3. The output for Gradation 5 are supplied in the same combination as in the case for Gradation 2. The outputs for Gradation 6 are supplied in the same combination as in the case for Gradation 1. The outputs of output terminal $\overline{A}$ to $\overline{H}$ are supplied to output gate units $GT_1$ to $GT_8$. For example, the outputs of output terminals $\overline{A}$ to $\overline{H}$ are supplied to AND gates $gt_6$ of the respective gate units $GT_1$ to $GT_8$ beginning from the top as shown in FIG. 5 in the sequential order of 1, 4, 6, 3, 5, 8, 2, 7. These input combinations provides predetermined distributions or dispersions of activated dots in both the horizontal and the vertical directions as illustrated previously in FIG. 3.

Figure 6:
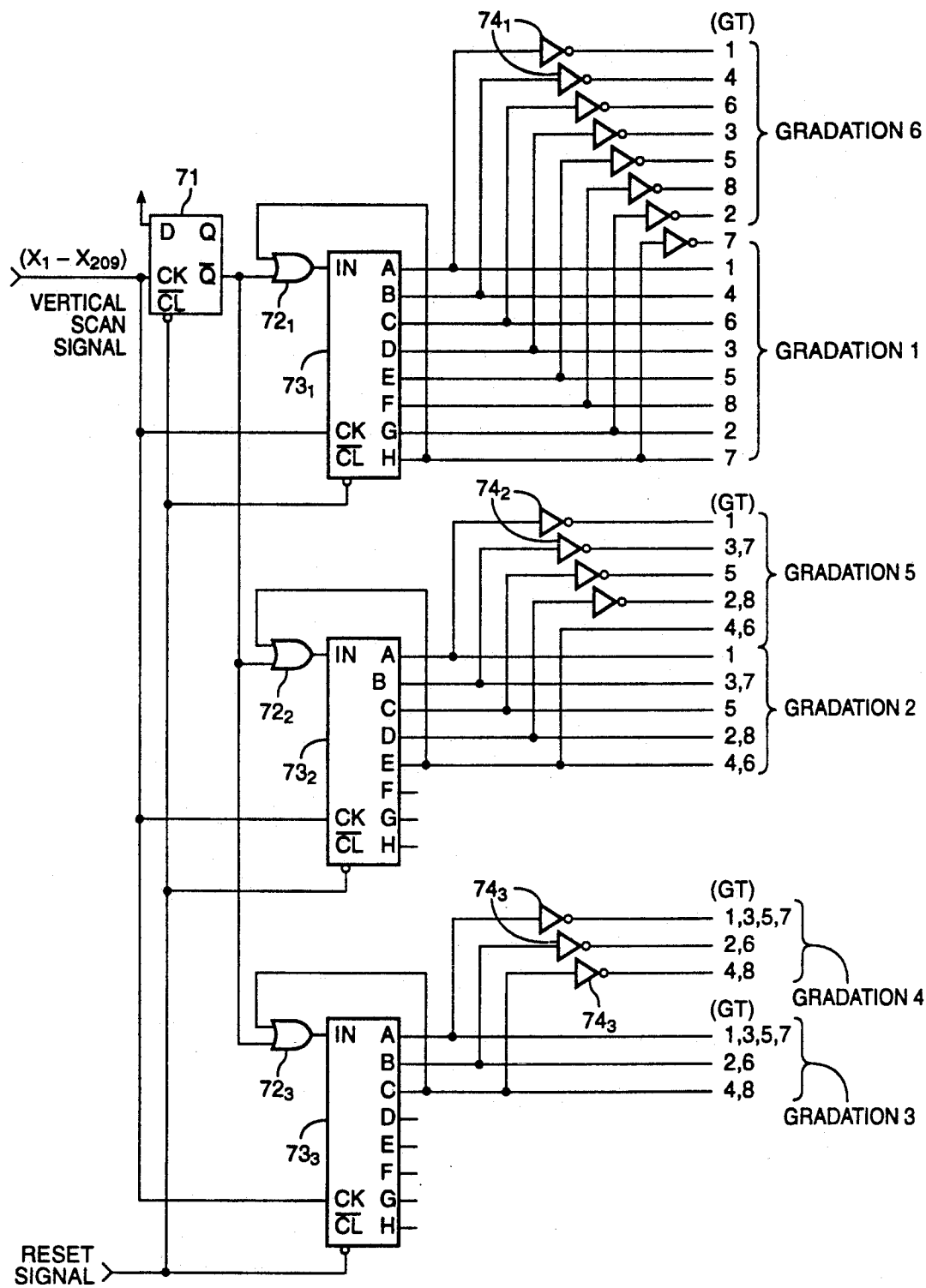
FIG. 6 is a detailed circuit diagram of a defined dot submatrix generating circuit employed in the display panel shown in FIG. 4A.

FIG. 6 shows a more detailed view of a dot matrix generating circuit 7. As shown in FIG. 6, dot matrix generating circuit 7 comprises a D flip-flop 71, three OR gates $72_1$ to $72_3$ for receiving the output $\overline{Q}$ from D flip-flop 71, three shift registers $73_1$ to $73_3$ each having an input terminal IN and eight output terminals corresponding to the output terminals A to H, and a total of sixteen inverters $74_1$ to $74_3$. Circuit 7 is characterized in that output terminal H of shift register $73_1$ is connected to OR gate $72_1$ so that eight signal outputs of output terminals A to H are repeated multiple times. The output terminal for output E of shift register $73_2$ is connected to OR gate $72_2$ so that five signal outputs of output terminals A to E are repeated multiple times. The output terminal for output C of shift register $73_3$ is connected to OR gate $72_3$ so that three output signals of output terminals A to C are repeated multiple times. Circuit 7 is also characterized in that inverters $74_1$ to $74_3$ are provided on the output side of shift registers $73_1$ to $73_3$, which are commonly employed by circuits $7_1$ and $7_6$ for Gradations 1 and 6, commonly by circuits $7_2$ and $7_5$ for Gradations 2 and 5, and commonly by circuits $7_3$ and $7_4$ for Gradations 3 and 4. Thus, the output terminals of shift register $73_1$ supply eight activation signals via output terminals A to H for both Gradation 1 and 6. Thus, by also passing the eight activation signals A to H through inverter $74_1$, eight activation signals $\overline{A}$ to $\overline{H}$ for Gradation 6 are also obtained. Similarly, from the output terminals of shift register $73_2$, five activation signals A to E for Gradation 2 are also obtained. Also, from the output terminals of shift register $73_3$, three activation signals A to C are obtained, and by passing the five activation signals through inverters $74_2$, $74_3$, activation signals $\overline{A}$ to $\overline{E}$ for Gradation 5 and activation signals $\overline{A}$ to $\overline{C}$ for Gradation 4 are also obtained.

In the embodiment described above, a 640 dots by 200 dots LCD panel is provided wherein defined dot submatrices are repeated 80 times in the horizontal direction. When a repeated cycle of activating dots in the vertical direction of the display is initiated, e.g., a cycle of repetition of a vertical scan line in a multiple of the prime numbers of 8, 5 and 3, which are vertical sizes of defined dot matrices illustrated in FIG. 3, positions of activated dots or the activated dot pattern will be fixed relative to every frame and the fixed dot pattern shifted vertically per frame. Then, the scan line has to be repeated in a cycle other than the above mentioned multiples and the vertical repetition will necessarily extend beyond horizontal scan line 200. In other words, it is necessary that a vertical scan signal be placed on the data signal outputs when the horizontal scan signal has reach horizontal scan lines 203, 209, 211, etc. However, since more than 201 horizontal scan lines are not needed in the image display, it is preferable that the repetition cycle number be as small as possible.

Also, when the vertical scan signal is supplied 209 times, i.e., vertical scan signal $X_{209}$ is applied, the corresponding vertical scan signal is applied, and then the vertical scan signal returns to start again with vertical scan signal $X_1$. Basically, it requires the least common multiple, or $8 \times 5 \times 3$ frames = 120 frames, for an applied dot distribution pattern to return to its initial or first pattern. In contrast, conventional 8 dots by 8 dots applied dot submatrices are set for respectively different gradations and, accordingly, activated dots interfere with one another in every frame. However, in this invention, the interference between different gradations are reduced to once in 120 frames with the result that a gradation display is more satisfactory for viewing to the naked eye.

Figure 7:
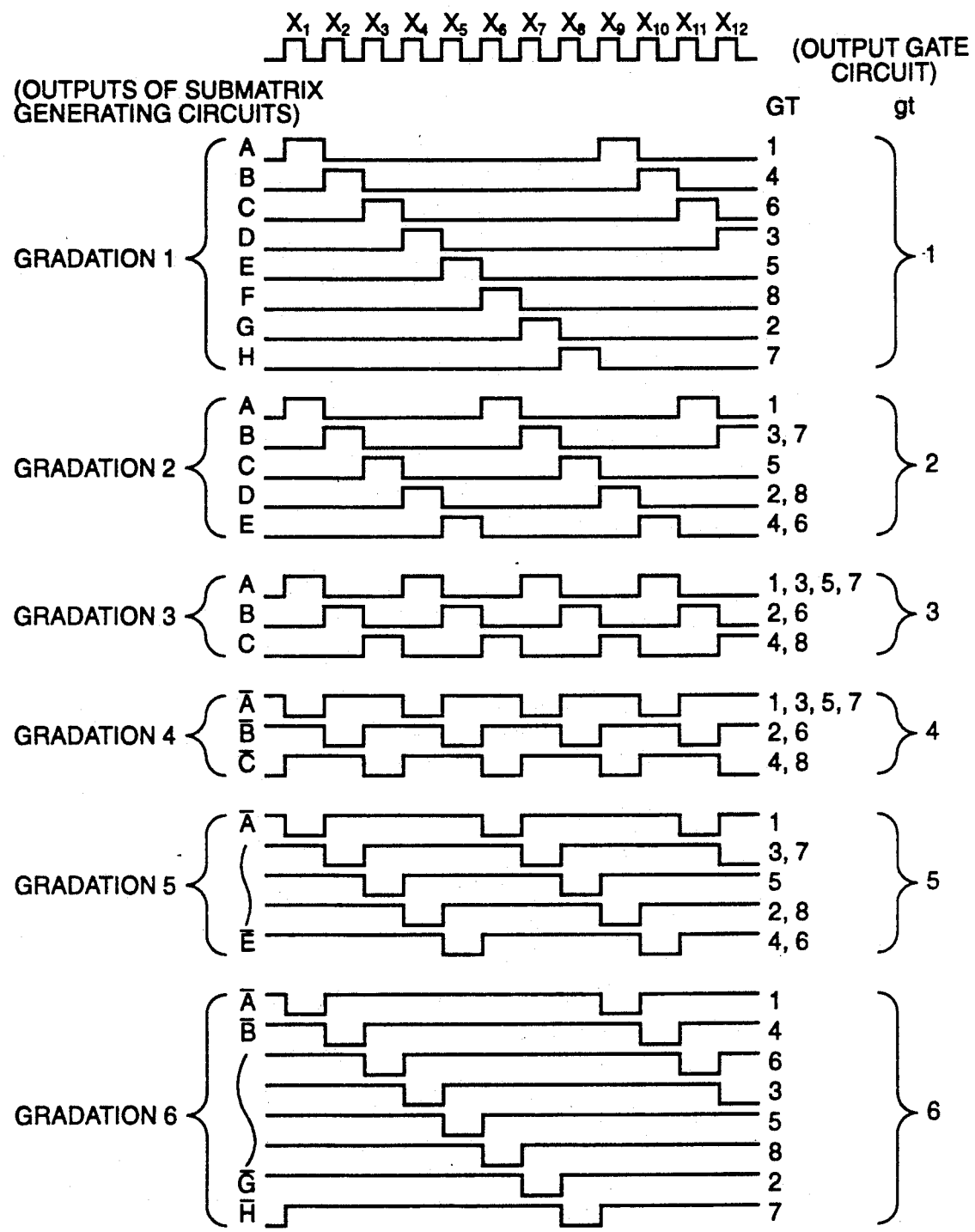
FIG. 7 is a timing chart or diagram of the signal application and operation of the display panel shown in FIG. 4A.

Reference is now made to the operation of the embodiment of FIGS. 4 to 6 by way of explanation with reference to the signal forms in FIGS. 7 and 8. FIG. 7 shows a timing diagram relative to the operation of the LCD panel of FIG. 4A. In FIG. 7, A to H and $\overline{A}$ to $\overline{H}$ represent the output terminals of dot matrix generating circuits $7_1$ to $7_6$ of FIG. 5 for generating applied dot matrices and correspond to the output terminals of shift registers $73_1$ to $73_3$, and to the output terminals of inverters $74_1$ to $74_3$. When the output terminals A to H and $\overline{A}$ to $\overline{H}$ are in a HIGH state or "1", activation signals for activating selected dot distributions in the respective submatrices are provided. $X_1$ to $X_{12}$ at the top of FIG. 7 represent a sequence of vertical scan signals. This timing diagram shows that shift registers $73_1$ to $73_3$ are reset to laterally shift the outputs of the activation signals sequentially from A→B→C→, etc. every time a vertical scan signal is supplied to their respective CK terminals.

Figure 8A:
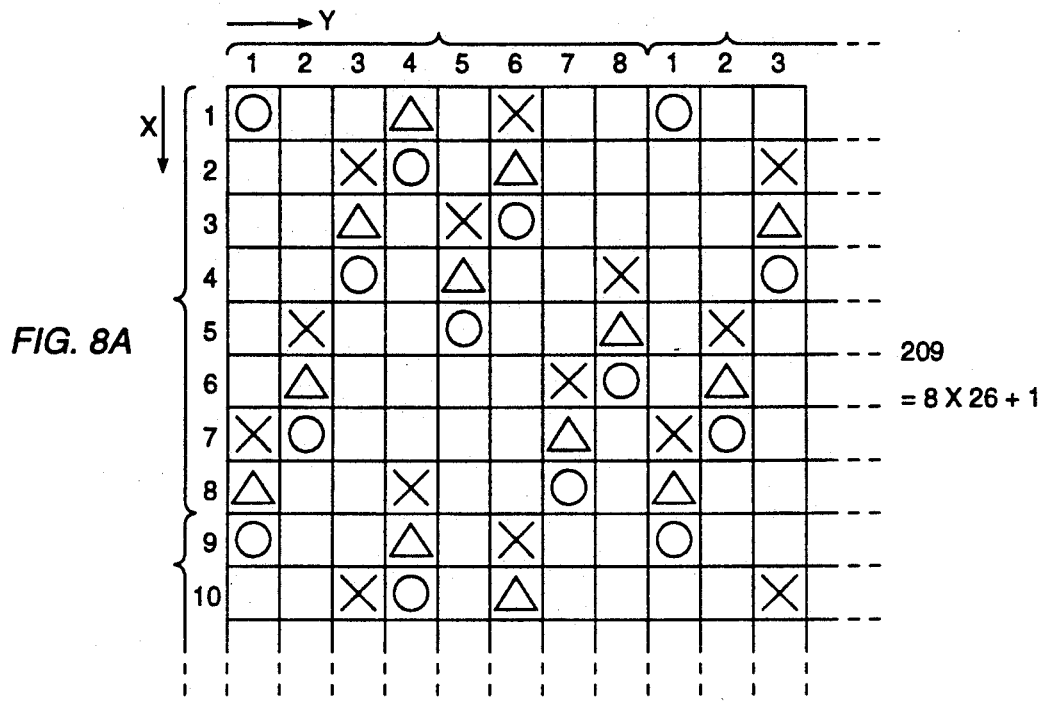
FIGS. 8A to 8C are a series of defined dot submatrices employed as examples of different lateral shift techniques for shifting of dot distributions in consecutive frames of a gradation pattern in the practice of the method of this invention.
Figure 8B:
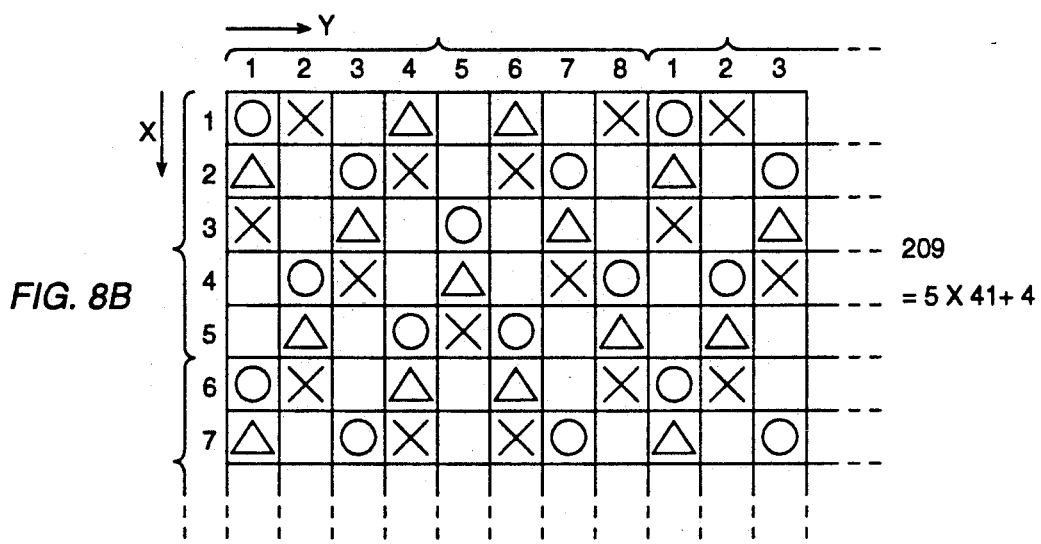
Figure 8C:
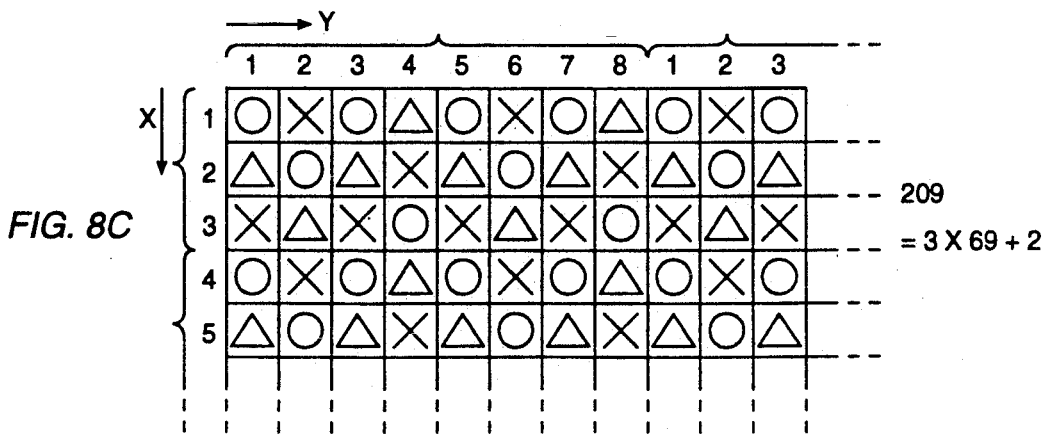

FIGS. 8A-8C shows activated dots obtained when the circuits of FIG. 4 to 6 are operated based on the sequence of signals shown in FIG. 7. FIG. 8A illustrates Gradation 1, FIG. 8B illustrates Gradation 2, and FIG. 8C illustrates Gradation 3. In each of the views of FIG. 8, the circles indicate activated dots in a first frame, the triangles indicate activated dots in a next frame, and the crosses indicate activated dots in a further frame following this next frame. The shift for each gradation is vertically upward N number of times per the formula associated with each frame.

First, when the horizon scanning signals $X_1$ to $X_8$ are sequentially applied, as shown in FIG. 7, the output terminals A to H of the dot matrix generating circuit $7_1$ for Gradation 1 are HIGH or "1", i.e., the activation signals for Gradation 1 are applied. Since the output terminals A to H are connected to respective gate units $GT_1$ to $GT_8$ in the sequential order of 1, 7, 4, 2, 5, 3, 8, 6, starting from the top, as shown in FIG. 6, the activated dots are at locations X=1-8 and Y=1, 7, 4, 2, 5, 3, 8, 6, as indicated by the circles in the submatrix of FIG. 8A. Then, this operational sequence is repeated.

As shown in FIG. 4A, scanning electrode driving circuit 4 has output terminals for the horizontal scan signals $X_1$ to $X_{209}$, but the display body 1 only contains 200 scan electrodes $2_1$ to $2_{200}$. Accordingly, the 8 dots by 8 dots dot submatrix for Gradation 1 is repeated 26 times in a single frame. In the next consecutive frame, the activated dots are shifted by one dot position in the submatrix, as indicated by the triangles in FIG. 8A. In a further next frame, the activated dots are shifted further by one dot position, as indicated by the crosses in FIG. 8A. The repeat value may be readily understood from the calculation, 209 (horizontal scan lines)=8 (horizontal dot positions in a submatrix)×26 (number of repeats)+1 (number of lateral shift frame line positions per dot).

The forgoing explanation is for an 8 dots by 8 dots applied dot submatrix for Gradation 1. For producing Gradation 2, the defined dot submatrix is 8 horizontal dots by 5 vertical dots. Accordingly, the applied dot submatrix is repeated 41 times in a single frame. In the first frame, the activated dots are shown as circles. In the next consecutive frame, the activated dots are shifted by four dots, as indicated by the triangles in FIG. 8B. In the frame following this next frame, the activated dots are again shifted by 4 dots, as indicated by the crosses in FIG. 8B. The repeat value is readily understood from the calculation, 209 (horizontal scan lines)=5 (horizontal dot positions in a submatrix)×41 (number of repeats)+4 (number of lateral shift line positions per frame).

In FIG. 8C, the defined dot submatrix for Gradation 3 is repeated 69 times in a single frame. In the first frame, the activated dots are shown as circles. In the next consecutive frame, the activated dots are shifted by 2 dots, as indicated by the triangles in FIG. 8C. In the frame following this next frame, the activated dots are effective by 2 dots, as indicated by the crosses in FIG. 8C. The repeat value of 69 may be readily understood from the calculation, 209 (horizontal scan lines)=3 (horizontal dot positions in a submatrix)×69 (number of repeats)+2 (number of lateral shift line positions per frame).

Thus, in this embodiment, as supported by the application of signals shown in FIG. 7, activated or nonactivated dots are: (1) scattered somewhat uniformly throughout the submatrix in both the horizontal and the vertical directions of respective submatrices, (2) positioned at selected random positions along the vertical and the horizontal rows of respective submatrices (3) preferably not adjacent to one another in any single frame or in previous or succeeding consecutive frames and (4) laterally shifted between consecutive frames one or more dot positions, either vertically, horizontally or diagonally, within a defined submatrix. As a result, the fringe phenomenon becomes less apparent to the naked human eye, and the gradation pattern interference is greatly reduced providing a more satisfactory multi-gradation display for viewing.

Figure 9:
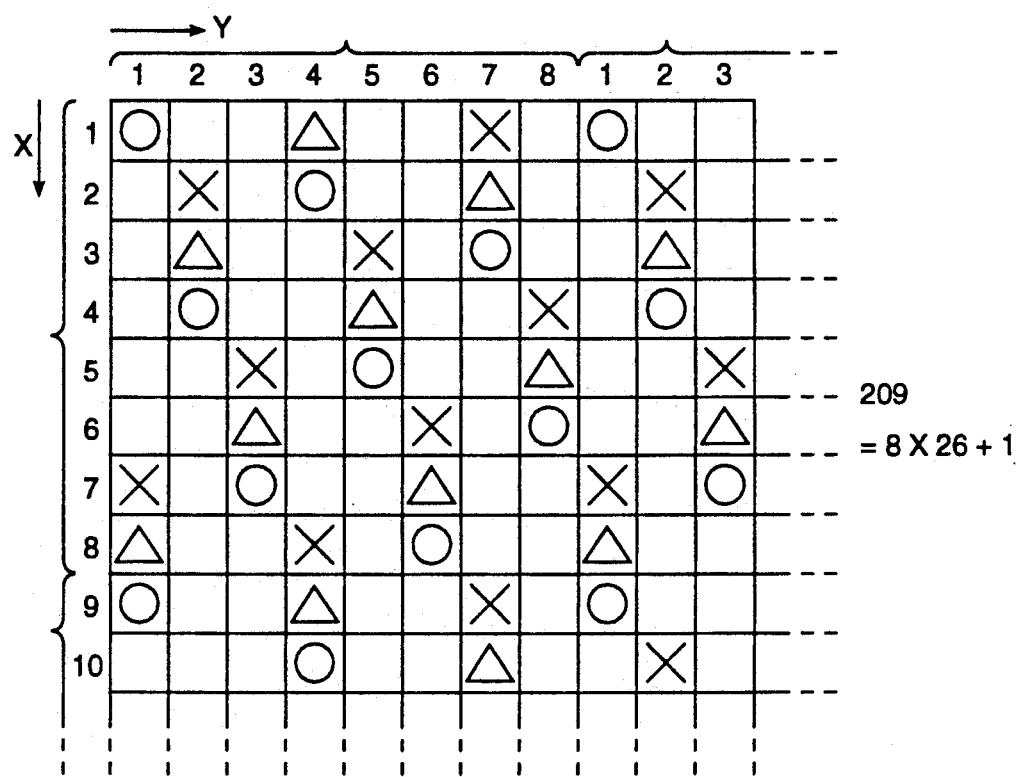
FIG. 9 is an example of another lateral dot shift technique from that shown in FIG. 8A for shifting of dot distributions in consecutive frames of a gradation pattern in the practice of the method of this invention.

FIG. 9 illustrates another example for explaining the same gradation effect illustrated in FIG. 8A. In the case here, the outputs from the output terminals A to H of shift registers $72_1$ to $72_3$ are distributed in the horizontally sequential order of 1, 4, 7, 2, 5, 8, 3, 6. In this example, as well as the example of FIG. 8A, activated dots are not positioned horizontally adjacent to one another in any given frame and are not in horizontally adjacent positions in preceding or succeeding frames. A more preferred approach would be that the activated dots are not positioned both horizontally and vertically adjacent to one another in any given frame and are not in both horizontally and vertically adjacent positions in preceding or succeeding frames.

While the invention has been described in conjunction with several specific embodiments, it is evident to those skilled in the art that many further alternatives, modifications and variations will be apparent in light of the forgoing description. For example, in the above described embodiment, the driving circuits are expressed relative to positive logic and signals but the same advantages can be obtained relative to the use of negative logic and signals. Also, the circuit illustration here is designed for vertical shifts of dot distribution patterns within defined submatrices and such lateral shifts could also be designed to occur in the horizontal direction of the dot matrix or in an oblique direction of the dot matrix. Further, the lateral shift of the dot distribution pattern may be a combination of vertical, horizontal and diagonal directions in K frames. Thus, the invention described herein is intended to embrace all such alternatives, modifications, applications and variations as fall within the spirit and scope of the appended claims.

What is claimed is:

1. A multi-gradation display comprising:
   display means comprising a field of dots formed in a matrix for displaying an image,
   a plurality of parallel signal electrodes and a plurality of scan electrodes formed in orthogonal directions relative to each other, the cross points of said electrodes defining said field of dots,
   scan electrode driving means having a plurality of scan signal output terminals for sequentially supplying scan signals to respective scan electrodes,
   signal electrode driving means for selectively supplying data signals to respective signal electrodes,
   electrode driving means for activating selected dots to form said image across said matrix field of dots,
   said matrix field of dots divided into a plurality of defined virtual submatrices of different two dimensional size and forming a predetermined gradation pattern of N activated or nonactivated dots distributed within each of said defined virtual submatrices, each of said virtual submatrices having at least a different number of rows of dots in one of said orthogonal directions compared with other of said virtual submatrices, said electrode driving means comprising:

gradation data encoder means for designating a particular gradation for the display of the image, dot submatrix generating means comprising a plurality of submatrix generating circuits for respectively generating one of said virtual submatrices with said predetermined gradation pattern of N activated or nonactivated dots, output gate means for applying data signals for creating an activated dot gradation per respective submatrix addressed by said electrode driving means based upon on outputs of said gradation data encoder means and said dot submatrix generating means.

2. A multi-gradation display according to claim 1 wherein said scan electrode driving means provides scan signal outputs in excess of the number of said scan electrodes.

3. A multi-gradation display according to claim 1 wherein the number of said scan signal output terminals exceeds the number of scan electrodes by an amount equal to the largest number of dot rows in said one orthogonal direction for any generatable dot submatrix plus 1.

4. A multi-gradation scheme in a display apparatus for application to a plurality of two dimensional submatrices together forming a dot matrix display of an image to be displayed which is refreshed per frame addressing of the entire field of dots in the matrix display and comprising a series of gradation patterns for application to said submatrices wherein at least one of said submatrices is defined to have a different dimensional size along at least one m or n side thereof as compared to at least several others of said submatrices in the display wherein different sizes of said gradation patterns represent different gradation levels, said gradation patterns comprising a predetermined dot distribution of N activated or nonactivated dots within each of said submatrices, said predetermined dot distribution being laterally shift within each respective submatrix at least one dot position in each consecutive frame of display of said image.

5. The multi-gradation scheme of claim 4 wherein said predetermined dot distribution is shifted a predetermined number of frames until the reappearance of said predetermined dot distribution in a first frame displayed whereby each dot in each of said submatrices is displayed at least once in said predetermined number of frames and are displayed an equal number of times over said predetermined number of frames.

6. The multi-gradation scheme of claim 5 wherein the two dimensional size of said at least one of said submatrices contains less m rows wherein a largest defined of said submatrices in said gradation pattern series is defined as n rows by m rows of dots.

7. The multi-gradation scheme of claim 4 wherein the two dimensional size of said at least one of said submatrices contains less m rows wherein a largest defined of said submatrices in said gradation pattern series is defined as n rows by m rows of dots.

8. The multi-gradation scheme of claim 7 wherein there are more than two different dimensional sizes of said submatrices.

9. The multi-gradation scheme of claim 8 wherein said largest defined submatrix is 8 rows by 8 rows of dots, at one other of said submatrices is 8 rows by 5 rows of dots and at least one other of said matrices is 8 rows by 3 rows of dots.

10. The multi-gradation scheme of claim 7 wherein the dots in said predetermined dot distribution are laterally shifted within each of said submatrices in a manner that the individual dots within each of said submatrices are not positioned adjacent to one another in consecutive frames.

11. The multi-gradation scheme of claim 7 wherein the dots in said predetermined dot distribution are laterally shifted within each of said submatrices so that the individual dots within each of said submatrices are not positioned adjacent to one another in consecutive frames.

12. A method of controlling a multi-gradation display comprising a display matrix of dots in rows formed in orthogonal directions of the matrix and wherein dots are selectively activated or not activated to form a displayed image said method comprising the steps of (a) dividing said display matrix into a plurality of virtual, two dimensional submatrices each comprising a plurality of display dots together which form the displayed image, (b) providing different orthogonal boundary sizes to said submatrices wherein each of the submatrices has a two dimensional size, of m dot rows in a first direction, X, by n dot rows in a second direction, Y, orthogonal to said first direction, X, and the size of at least some of said submatrices differing from the size of at least some of the others of said submatrices by at least a difference in the total number of dot rows in one of said orthogonal directions X or Y, (c) defining each of said submatrices of a given size, m by n, as a gradation level, wherein each such level comprises a pattern of N activated or nonactivated dots distributed throughout a given submatrix and accordingly activated or nonactivated within a single display frame of the image to be displayed, (d) dynamically selecting different gradation levels, g, to complete said formed display image according to the white, black and gray scale representations of portions of the image to be displayed, (e) sequentially shifting the pattern of distributed positions of N activated or nonactivated dots within each of the selected gradation levels, g, to new laterally disposed positions of N activated or unactivated dots within each of the selected gradation levels, g, over successive display frames of the displayed image until K display frames have transpired wherein K is equal to said dot rows total number in said one orthogonal direction relative to each of the selected gradation levels, g, and (f) repeating the N dot distributed position shifting of step (e) over successive groups of K display frames until the displayed image is changed to a different displayed image wherein steps (d), (e) and (f) are repeated until the displayed image is again changed.

13. The method according to claim 12 wherein the distributed N dots in each of the selected gradation levels, g, is equal to said dot rows total number in said one orthogonal direction.

14. The method according to claim 13 wherein the occurrence in K display frames of adjacently disposed activated or nonactivated N dots appearing in immediately adjacent row positions of rows of dots in the other of said respective orthogonal directions of each of the selected gradation levels is designed to be of a minimum occurrence.

15. The method according to claim 12 wherein the lateral shifting of the distributed N dots in successive display frames of the displayed image is at least one dot row position.

16. The method according to claim 12 wherein the lateral shifting of the distributed N dots is uniformly in one direction across each of the selected gradation levels.

17. The method according to claim 16 wherein the lateral shifting of the distributed N dots is uniformly in one orthogonal or diagonal direction across each of the selected gradation levels.

18. The method according to claim 16 wherein the lateral shifting of the distributed N dots is at least one dot row position.

19. The method according to claim 18 wherein the lateral shifting of the distributed N dots of dot row positions is greater than one row of dots.

20. The method according to claim 18 wherein the lateral shifting of the distributed N dots of dot row positions is an integer less than eight.

21. The method according to claim 12 wherein the size of at least some of the submatrices differ from the size of at least some of the other submatrices by a difference in the total number of rows of dots m and n in both of said orthogonal directions X and Y.

22. The method according to claim 12 wherein there are three different two dimensional sizes of submatrices.

23. The method according to claim 22 wherein the sizes of the submatrices comprise three pairs of submatrices comprising six gradation levels wherein submatrices of each pair respectively have N activated or N nonactivated dots and wherein said submatrix pairs respectively comprise 3 dot rows, 5 dot rows and 8 dot rows in said one orthogonal direction.

24. The method according to claim 12 wherein
the distributed N dots in a given submatrix is equal to the number of dot rows in the other of said orthogonal directions wherein said number of dot rows is the same in the selected gradation levels, g,
the distributed N dots are randomly positioned along m and n rows so that to the extent possible a distributed N dot in any such row is not immediately adjacent to a distributed N dot in an immediately adjacent row m or n,
the lateral shifting of the distributed N dots in successive display frames is accomplished without change in the pattern of the original N dot spatial distribution through the submatrices, and
the lateral shifting of the distributed N dots is accomplished uniformly in one direction across the array whereby gradation pattern interference is significantly reduced.

25. The method according to claim 12 wherein
the distributed N dots in a given submatrix is equal to the number of dot rows in the other of said orthogonal directions wherein said number of dot rows is the same in the selected gradation levels, g,
each distributed N dot in a submatrix is positioned along a respective row of the submatrix in a manner that a distributed N dot in any such row is not immediately adjacent to a distributed N dot in an immediately adjacent row of the same submatrix,
the lateral shifting of the distributed N dots in successive display frames is accomplished without change in the pattern of the original N dot spatial distribution through the submatrices, and
the lateral shifting of the distributed N dots is accomplished uniformly in one direction across the array whereby gradation pattern interference is significantly reduced.

26. A method of controlling a display to provide multiple levels of gradation during displayed frames of an image on a dot matrix display comprising the steps of:
dividing the dot matrix display into a plurality of two or more virtual dot submatrices each comprising a plurality of dot rows and columns,
designating a number of gradation levels, g, of the image to be displayed relative to a group of said virtual dot submatrices individually differing from one another in at least one dimensional direction by the number of rows m or n,
selecting different virtual dot submatrices from said group depending on the gradation level of the image to be displayed,
activating a predetermined pattern of dots in each selected virtual dot submatrix according to designated gradation levels of the image to be displayed,
laterally shifting the activated predetermined pattern of dots at least one dot position through the selected virtual dot submatrices in each display frame period, and
continuing the lateral shifting and repeating the patterns of lateral shifting of the activated predetermined pattern of dots through the selected virtual dot submatrices in successive display frame periods until the image to be displayed is changed.

27. A method of controlling multi-gradation relative to the display of dots in a matrix of columns and rows of dots forming a two-dimensional display of an image to be displayed per unit frame comprising the steps of:
dividing the display dot matrix into a plurality of two dimensional dot submatrices differing from each other in their size in at least one orthogonal direction by the number of rows or columns determining their boundary size resulting in a different number of display dots per submatrix to respectively provide a different level of gradation,
selecting different dot submatrices according to the gradation level of portions the image to be displayed,
dynamically changing the arrangement of the different two dimensional dot submatrices across the dot matrix according to changes desired in the gradation level due to changes in the image to be displayed,
determining a distribution and number of dots to be actuated throughout each selected dot submatrix per unit frame, and
selectively actuating the determined distribution of dots in each dot submatrix to be displayed per unit frame, and
laterally shifting the determined distribution of actuated dots within each dot submatrix in successive display frames of the image.

28. The method according to claim 27 wherein the boundary size of dot submatrices is different in the number of dot rows in one orthogonal direction of the submatrices.

29. The method according to claim 28 wherein the boundary sizes of dot submatrices comprise dot rows three rows, five rows and eight rows.

30. The method according to claim 27 wherein the actuated dots in each column or row of a displayed dot submatrix are uniformly shifted across the dot submatrices in successive display frames by more than one column or row.

31. The method according to claim 27 wherein actuated dots in a selected dot submatrix are dispersed throughout the matrix and shifted within the dot submatrix in successive frames in a manner that actuated dots within said selected dot submatrix in a next successive frame in a given column or row are positioned so as not to be adjacent to actuated dots in an immediately adjacent column or row of said selected dot matrix in an immediately previous or subsequent display frame.

32. The method according to claim 27 wherein the position of actuated dots in a displayed dot submatrix are laterally shifted by a predetermined number of dot rows or columns in a predetermined direction across a displayed dot submatrix in successive display frames.

33. The method according to claim 27 wherein said actuated determined distribution of dots in said selected dot submatrices comprises a select group of dots having a first binary value distributed within a majority of submatrix dots having a second binary value, either the first or second binary value being an activated state and the other being a nonactivated state.

34. A multi-gradation display comprising:

display means for displaying an image in a display frame period comprising a plurality of dots at the cross points of a plurality of spatially parallel signal electrodes $3_1$-$3_{340}$ and a plurality of spatially parallel scan electrodes $2_1$-$2_{200}$, scan electrode drive means 4 for supplying scan signals in sequential order to said scan electrodes, signal electrode drive means 5 for supplying data signals to said signal electrodes, said scan electrode drive means and signal electrode drive means together creative of dots at said scan electrodes and signal electrodes cross points where said scan and data signals are activated to form the displayed image, said signal electrode drive means 5 comprising gradation data decoder means 6 to provide for selection of gradation levels according to the gradation requirements of the displayed image, dot submatrix generating means 7 for respectively creating a series of two dimensional dot submatrices at least some of which differ in at least one dimensional direction each establishing a predetermined gradation level to be displayed, and output gate means $GT_1$-$GT_8$ for applying data signals for creating an activated dot gradation per respective submatrix addressed by said signal electrode driving means based upon on outputs of said gradation data encoder means and said dot submatrix generating means.

35. The display according to claim 34 wherein said scan electrode drive means 4 is provided with a greater number of scan signal output terminals $X_1$-$X_{209}$ than the number of scan electrodes $2_1$-$2_{200}$.

36. The display according to claim 35 wherein the total number of scan signal output terminals $X_1$-$X_{209}$ utilized in the display of the image is determined by the combined total number of dot rows of displayed submatrices in the direction of scanning of said electrodes $2_1$-$2_{200}$.

* * * * *